United States Patent Office 3,343,332
Patented Sept. 26, 1967

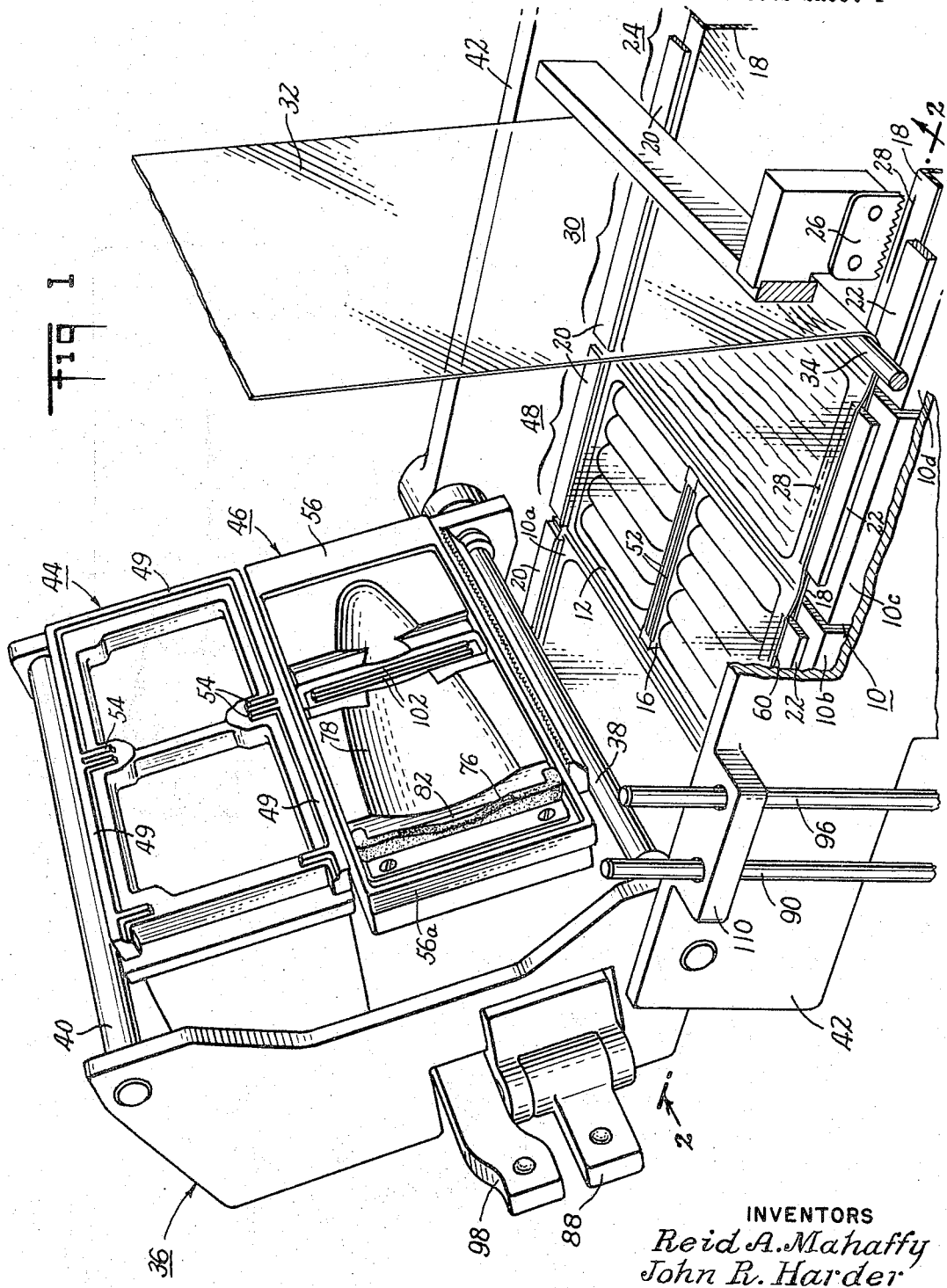

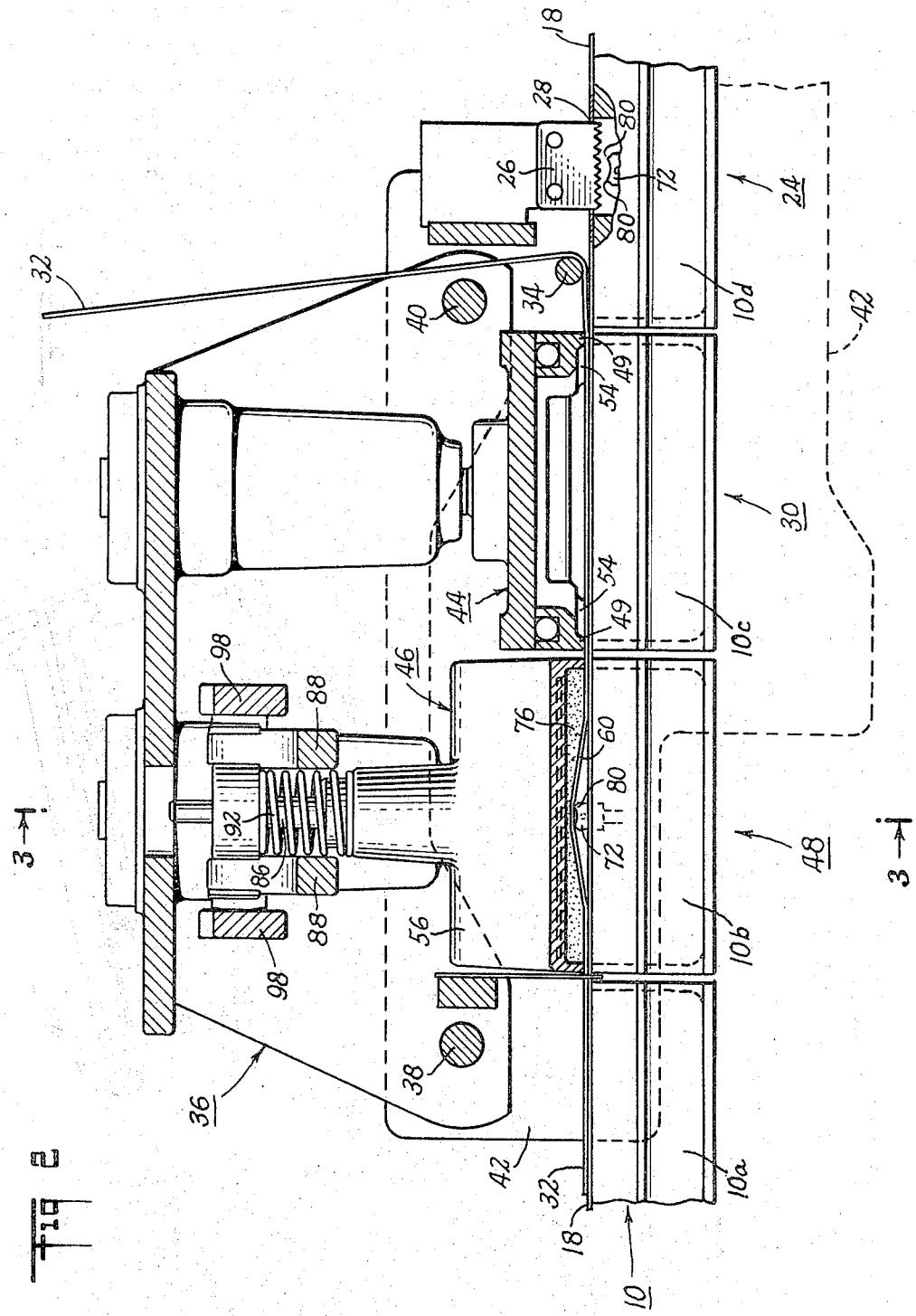

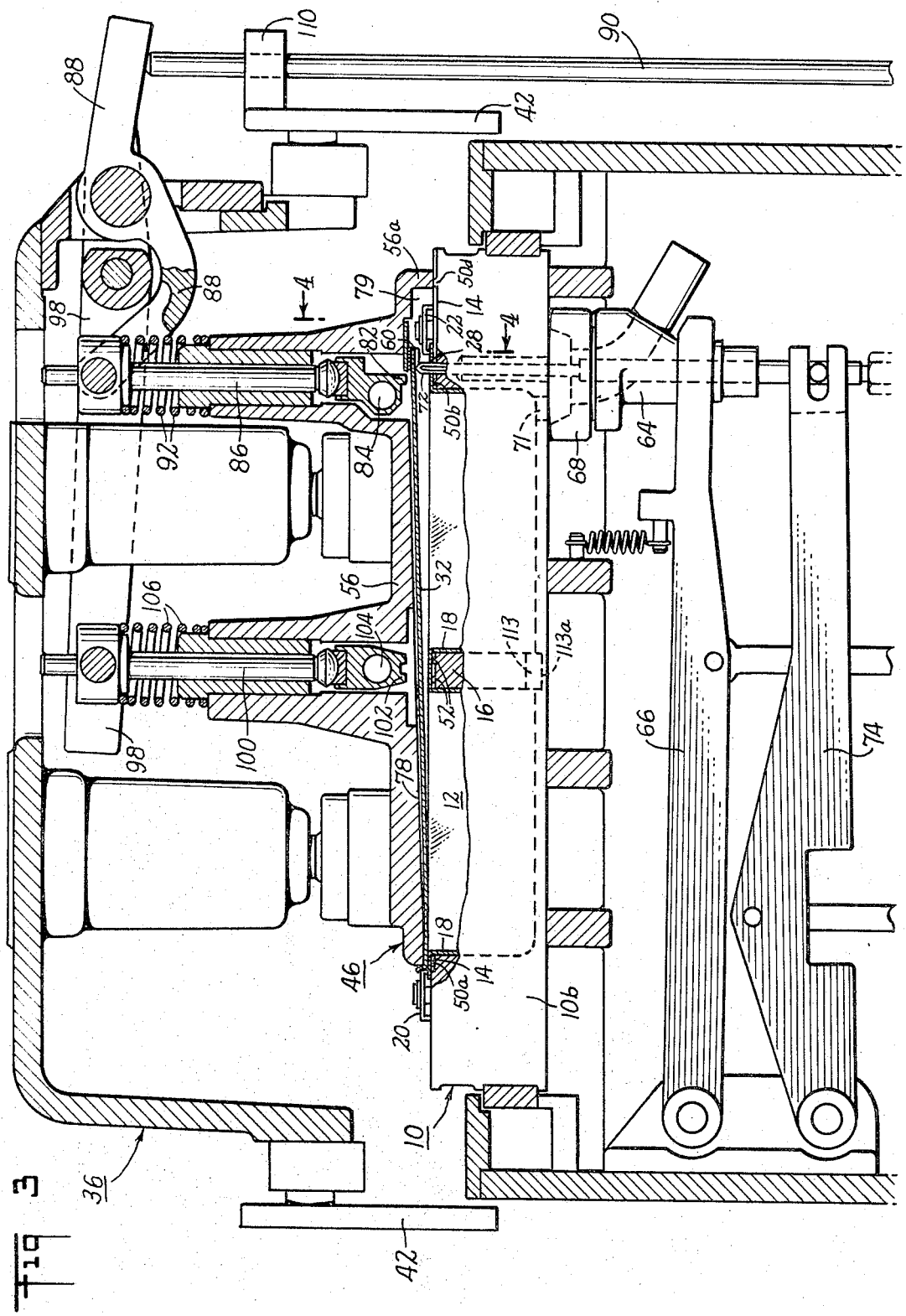

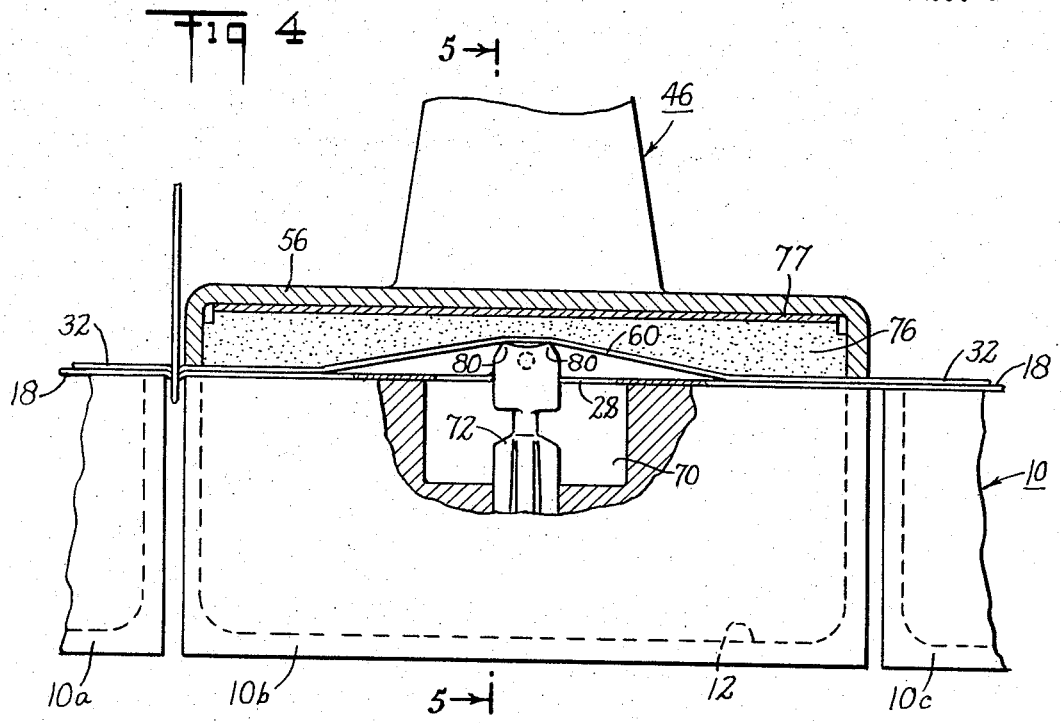
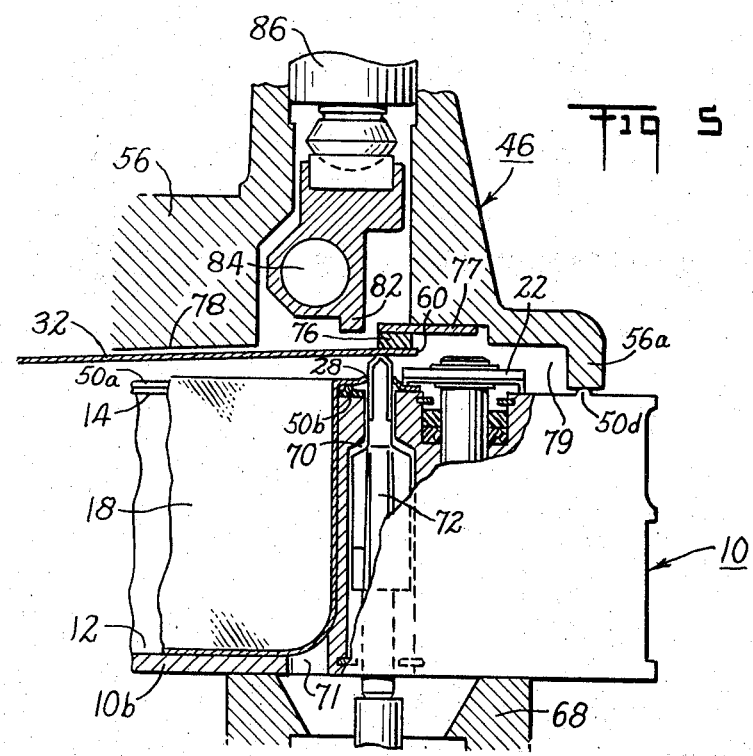

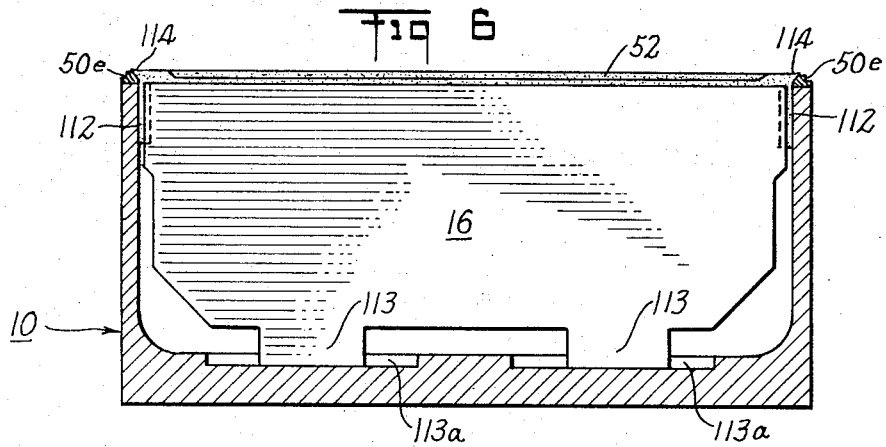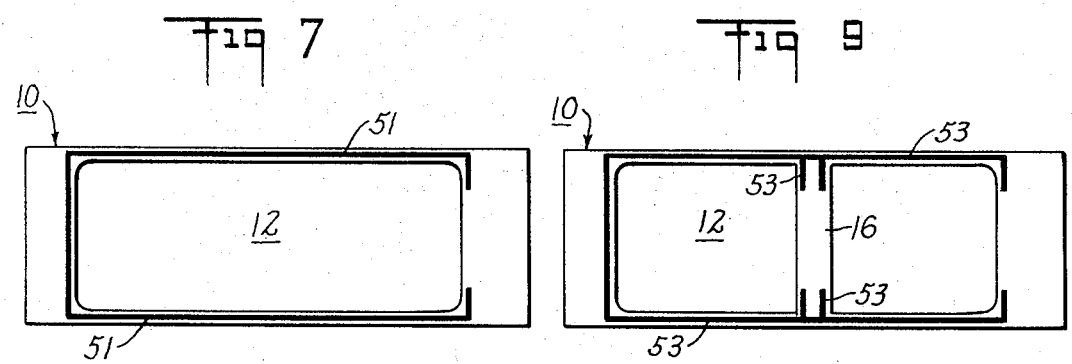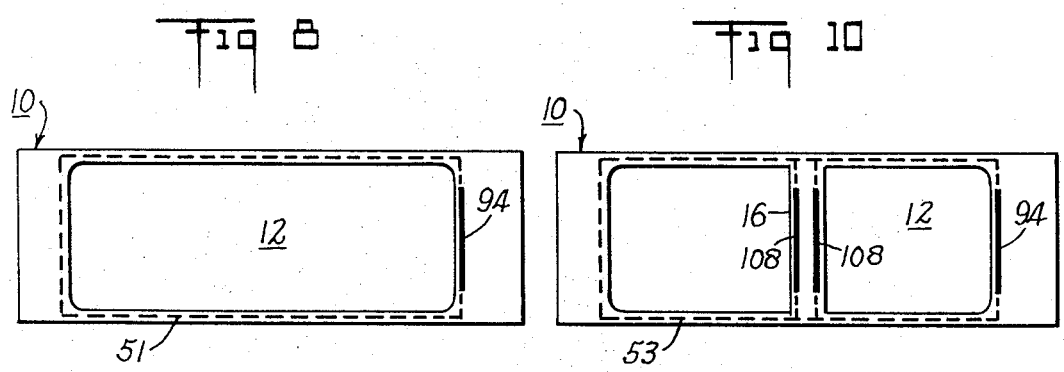

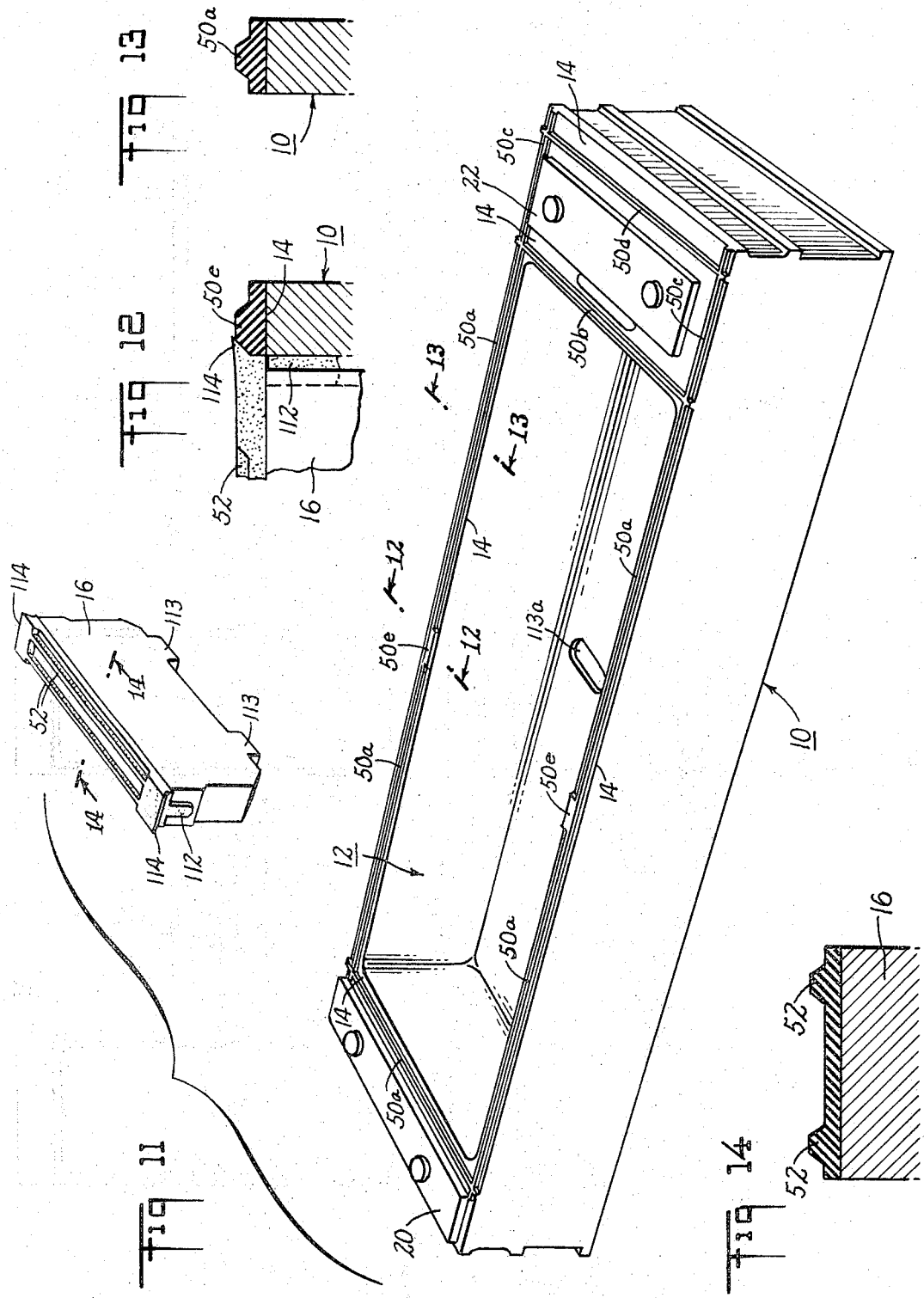

---

3,343,332
PACKAGING APPARATUS AND METHOD
OF PACKAGING
Reid A. Mahaffy, Montclair, John R. Harder, Cedar Grove, and Wesley W. Pinney, Montclair, N.J., assignors to Mahaffy & Harder Engineering Company, Totowa, N.J.
Filed May 20, 1964, Ser. No. 368,926
9 Claims. (Cl. 53—22)

This invention relates to packaging machines and methods of packaging. More in particular, this invention relates to improved means for packaging a variety of products, such as frankfurters, bacon or the like, in gas-tight containers formed of flexible packaging material.

For a number of years, there has been considerable use of automatic machines for packaging a wide variety of products and articles in containers formed of flexible plastic film from supply rolls. One particular machine which has been used with significant commercial success is disclosed in U.S. Patent 3,061,984 issued Nov. 6, 1962. Related packaging apparatus providing further improved operating features is disclosed in U.S. Patent 3,125,839 issued to R. A. Mahaffy et al. on Mar. 24, 1964, and copending application Ser. No. 213,705 filed by R. A. Mahaffy et al. on July 31, 1962, now Patent No. 3,180,066.

In the basic machine shown in U.S. Patent 3,061,984, the apparatus comprises an endless chain of relatively long and rectangular-shaped trays (also referred to as "dies"), each having a side-by-side pair of approximately square cup-shaped cavities. These trays are shifted with an intermittent motion past a series of packaging stations where appropriate operations are carried out to form the completed package. One of the initial operations is to vacuum-draw a first sheet of thin plastic film packaging material down into the receptacles defined by the tray cavities, thereby to form plastic product-receiving cups. The products to be packaged then are placed in these cups and a second sheet of plastic film packaging material is placed over the tray to complete the container through subsequent sealing and evacuation operations.

This twin-cup tray arrangement has proven advantageous for packaging a number of products, such as frankfurters and luncheon meat, which can be loaded as separate groups into the approximately square cups of each tray. The two packages formed in each tray can readily be evacuated through a common opening formed in the strip of plastic film (referred to as the "flange") joining the two packages at the center of the tray. This evacuation operation is completed quickly when the air is exhausted through a channel of substantial cross-section created by a web-lifter or "sheet-separator" moving up through the evacuation opening to push the upper plastic sheet away from the lower sheet.

Although advantageous for a number of products, such a twin-cup tray arrangement is not entirely convenient for use with products which are relatively elongate, for example strips of bacon and similar items. To accommodate such elongate products more conveniently, the twin-cup trays of the basic machine referred to above can of course be replaced by trays of the same outer dimensions but providing only a single receptacle. An arrangement of this type is illustrated in FIGURE 12 of the above-identified U.S. Patent 3,061,984. Since in this latter arrangement there is no film flange portion at the center of the tray, the package is evacuated through an opening in a flange of the package at the side of the tray. To accommodate the desired rapid evacuation, a sheet-separator is arranged for movement up through the evacuation opening, now at the side of the tray, to force the upper plastic sheet away from the lower sheet and thereby create an evacuation channel of suitable size.

It will be evident that a machine of the type illustrated in FIGURE 12 of U.S. Patent 3,061,984 would not provide the advantages of the basic twin-cup machine when used to package frankfurters or luncheon meat. Similarly, it will be evident that the basic twin-cup machine is not suited for elongate products such as bacon and the like. Thus, it is one of the overall goals of this invention to avoid this inflexibility and to provide a machine suitable for use with a wider variety of product types.

In the disclosed apparatus embodying the present invention, the packaging trays are provided with special means permitting the ready conversion of each tray from a twin-receptacle configuration to an elongate single-receptacle configuration, and the machine is provided with special heat sealing and evacuation means which are operable with either of the selected configurations. This disclosed embodiment also incorporates side evacuation means uniquely constructed to minimize stretching of the upper plastic sheet as this sheet is lifted up to form the evacuation channel.

Accordingly, it is an object of this invention to provide packaging apparatus and methods which are superior to those used heretofore. Another object of this invention is to provide improved apparatus for packaging elongate products such as bacon. Still another object of this invention is to provide packaging apparatus which is adapted for use with products of various dimensions. Other objects, aspects and advantages of this invention will in part be pointed out in, and in part apparent from, the following description considered together with the accompanying drawings, in which:

FIGURE 1 is a perspective view of a packaging machine with the packaging head in tilted-back position to show the means used for sealing the packages prior to and during the evacuation thereof;

FIGURE 2 is a vertical section taken along line 2—2 of FIGURE 1 and partly broken away to show certain operating elements;

FIGURE 3 is a cross-section taken along line 3—3 of FIGURE 2, particularly illustrating how the upper sheet is lifted away from the tray to form the evacuation channel into the container;

FIGURE 4 is an enlarged detail view based on FIGURE 2 and showing the sheet separator in its upper position;

FIGURE 5 is a section taken along line 5—5 of FIGURE 4 to show details of the sheet sealing arrangement operative during evacuation of the container;

FIGURE 6 is a cross-sectional view showing the removable center partition of the tray;

FIGURES 7 through 10 show the outlines of the heat healed portions of the packaging material;

FIGURE 11 is an exploded perspective view of the tray and its removable partition; and FIGURES 12 through 14 are detail sections taken along corresponding lines of FIGURE 11.

Referring now to FIGURE 1, there is shown a portion of the packaging apparatus comprising an endless chain of dies in the form of interconnected trays 10, individual trays being designated with different suffixes 10a, 10b, 10c and 10d. These dies all move in unison with an intermittent indexing motion from right-to-left past a series of packaging stations. Each of the dies is rectangular in shape (see also FIGURE 11) and defines a container-forming cavity 12 having marginal surfaces 14 extending entirely around the periphery of the cavity.

Releasably secured in this cavity 12 is an upstanding partition 16 (shown removed in FIGURE 11) which serves to establish two side-by-side packaging receptacles in the die, e.g. to accommodate the packaging of products such as luncheon meat or frankfurters as shown in one of the dies 10b in FIGURE 1. Another of the dies 10c is shown in FIGURE 1 with its partition 16 removed, for the purpose of illustrating an aspect of the invention which will be described in more detail hereinbelow. It should be noted, however, that in normal operation of the packaging apparatus all of the dies 10 will be identical, i.e. they will all be provided with the partition 16, or else this partition will be removed from all.

As described generally in the above-identified U.S. Patent 3,061,984, one of the initial packaging operations performed by this machine consists of applying to each die in succession a first sheet of flexible plastic material 18. At a vacuum-forming station preceding the operating stations shown in this application, the central region of this sheet 18 is drawn down into the die cavity 12 to form cups into which the products are to be placed. The parts of the plastic sheet 18 surrounding the die cavity form flange portions overlying the marginal surfaces 14 of each die, including the top surfaces of the partition 16 if it is present. At the side marginal surfaces, each die is provided with spring-biased clamps 20 and 22 to hold the packaging material securely on the die. At a station preceding the vacuum-forming station, both clamps are lifted momentarily to permit the side flange portions of sheet 18 to be tucked therebeneath. When these clamps drop back down into normal position (as shown herein), they firmly grip the side flange portions of the plastic sheet to maintain this sheet in place for subsequent packaging operations.

After the sheet 18 is clamped in place and stretched down into the die cavity 12, the products to be packaged are loaded into this cavity, e.g. by the use of an automatic loader as disclosed in the above-identified copending application Ser. No. 213,705. Also, at the packaging station identified with reference numeral 24 (FIGURE 1), the sheet 18 is pierced by a slitter 26 to make an evacuation opening 28. It is through this opening that the container ultimately formed in the die cavity is evacuated.

As each die 10 is moved from station 24 to the next station 30, a second sheet of flexible packaging material 32 is applied, as by means of a roller 34, to the top of the die to cover the product now in the die cavity. It should particularly be noted that, as the dies advance, the sheet 32 remains draped over the top of the near clamp 22, for reasons that will become apparent as the description proceeds.

The machine also includes a packaging head 36 (upper left-hand corner of FIGURE 1) which is pivotally mounted on a rod 38 to permit the head to be tilted back for servicing. This head is shown herein in its tilted-back position simply to provide a clear view of the various internal operating parts. To operate the machine, the packaging head must of course first be rotated clockwise to a horizontal position (see FIGURE 2) immediately above the dies 10 where it is locked in place by a removable rod 40. Each time the dies are stopped, i.e. during the "dwell time" between the intermittent indexing movements, this head 36 is moved down a small distance (about ½") by means of its pivoted support arms 42 (FIGURE 1), and preliminary sealing means 44 and final sealing means 46 carried by this head make contact with the plastic sheet material 32 overlying the dies in both packaging stations 30 and 48.

The preliminary sealing means 44 consists of conventional heated bars 49 arranged to press the two plastic sheets 18 and 32 against the die to secure these sheets together around almost the entire periphery of the die cavity 12. For this purpose, the bars 49 extend substantially around the marginal surfaces 14 of the die, and are aligned with resilient beading 50a and 50b (FIGURE 11) on these surfaces which serve as a backing for the pressure engagement between the heated bars and the plastic sheets.

When the die 10 has no center partition 16, as is the case with the specific die 10c illustrated in packaging station 30, the sheets 18 and 32 will be heat-sealed together by the bars 49 in the areas shown in bold outline at 51 in FIGURE 7. If the partition 16 is present, as is the case with the specific die 10b illustrated in packaging station 48, the two sheets 18 and 32 will be sealed together in the areas shown in bold outline at 53 in FIGURE 9, it being noted that the top of the partition is provided with two parallel resilient beads 52 adapted to cooperate with the short stub bars 54 which seal the sheets together a small distance towards the center of the partition. Whether or not the partition is present, it will be evident that the preliminary sealing effected by the sealing bars 49 extends around the periphery of the die cavity 12 except for the side marginal surface where the evacuation opening 28 is located.

The final sealing means 46, operative at the next packaging station 48, includes a vacuum chamber 56 which moves down with the head 36 and engages the die to cut off communication between outside atmosphere and the interior of the containers being formed by the two sheets of packaging material 18 and 32. To effect this seal, the bottom surfaces of the chamber walls are aligned with, and seat against, the resilient beading 50a, 50c and 50d (FIGURE 11) of the die 10.

It should particularly be noted that the right-hand side wall 56a (FIGURE 3) of this chamber structure 56, and the side beading 50d which cooperates therewith, are both located outboard of the clamp 22, i.e. this wall and the cooperating beading are between the clamp and the outer edge of the die. With this construction, it will be evident that the side wall 56a does not touch the plastic film, but contacts the die beading directly. The result is that the side edge portion 60 of the upper plastic sheet 32, as especially shown in FIGURES 3 and 5, is maintained free for upward movement away from the evacuation opening 28 in the lower sheet 18.

After the vacuum chamber 56 has been seated in position on the die 10, an exhaust housing 64 (FIGURE 3) beneath the die is shifted up, as by the usual linkage mechanism 66 operated by the main machine drive, to make a gas-tight connection with a coupling 68 carried by the die. This coupling preferably is like the slidable seal arrangement shown in the above-identified U.S. Patent 3,125,839, and provides communication, through suitable passages in the die, with the interior of the cavity 12 and with a chamber 70 (FIGURE 4) holding captive a sheet separator 72 (sometimes also referred to as a web lifter). Mounted for axial movement within the housing 64 is a stud (not shown herein) which, after connection has been established with the die coupling 68, is shifted up by a linkage 74 (FIGURE 3) to contact and force the sheet separator 72 up to the position shown in FIGURES 3 through 5.

When the sheet separator 72 is thus moved up, it engages the free side edge portion 60 of the upper plastic sheet 32, where it is draped over the clamp 22, and lifts this sheet portion to an elevated position (see particularly FIGURE 4) where it is pressed against a resilient arch member 76 secured to a plate 77 mounted on the roof of the vacuum chamber 56. To accomodate this upward movement of the plastic sheet within a minimum volume of the vacuum chamber, the chamber roof is formed with a scallop-like recess 78 (FIGURE 1) having a curved shape conforming generally to the surface configuration of the raised portion of the plastic sheet. The top of the sheet separator 72 is formed with a pair of pointed teeth 80 which are blunt enough not to completely pierce the plastic sheet 32 but which impress this sheet to effect a gripping engagement therewith and thereby prevent the sheet from sliding off the sheet separator 72 as the latter moves up to its extended position.

The arch member 76 is made of rubber having suitable resiliency and other characteristics to create a substantially gas-tight seal along the region of contact with the side edge portion 60 of the plastic sheet 32 and also with the roof of the chamber 56. Thus, the interior of the container formed within the die cavity 12 by the two plastic sheets is essentially isolated from the main central region of the vacuum chamber, i.e. the part located directly above the die cavity.

While the sheet 32 is in its raised position, as shown in FIGURES 3 through 5, vacuum is applied by the housing 64 to the coupling 68 on the bottom of the die. Thus, the air within the interior of the container in the die cavity 12 is evacuated rapidly through the opening 28 in the lower plastic sheet 18, this air passing in part around the outside of the sheet separator 72 and in part through an internal passage within the sheet separator. The support posts of the clamp 22 (not shown herein), which are slidably mounted in the die for vertical movement to permit the clamp to be lifted as discussed above, are provided with a conventional gas-tight seal, such as a stuffing box arrangement, to assure that there can be no air leakage through or around the clamp operating mechanism during the evacuation operation.

It should also be noted that the entire interior of the container will be evacuated through the opening 28, whether the partition 16 is present or not. That is, notwithstanding the fact that the evacuation opening is at one side of the die, the partition does not interfere with the exhaust flow of air from the packaging receptacle remote from this opening since the upper plastic sheet is raised along its entire width, i.e. from side-to-side across the die, and thus provides a communication channel over the partition when the latter is in place.

After the container has been evacuated, it may be desired to inject into the package a small amount of some inert gas, such as nitrogen, which will not injure the enclosed food product. This gas is supplied and introduced by conventional means (not shown herein) through the internal conduit of the sheet separator 72 while the latter remains in its raised position. It may particularly be noted that the sealing provided by the arch 76 assures that there will be no loss of gas into the main central region of the vacuum chamber 56, i.e. the gas is confined to the interior of the container and the small compartment 79 (FIGURE 5) which extends laterally beyond the side edge of the upper sheet 32 of packaging material.

After the evacuation and gas-filling operations are complete, the sheet separator control linkage 74 returns to its normal position and the sheet separator drops back down to release the tension on the upper sheet 32. Thereafter, the final sealing operation is carried out to complete the hermetic seal around the entire periphery of each package.

Referring again to FIGURES 3 and 5, the final sealing at the side of the die 10, i.e. adjacent the evacuation opening 28, is effected by a sealing bar 82 which is heated in the usual way by an electrical element illustrated at 84. This sealing bar 82 is carried by a member 86 which is slidably mounted for vertical movement in part of the structure forming the vacuum chamber 56. Member 86 is operated by a pivoted link 88 which extends out laterally to the side of the machine where it is engaged by an actuating rod 90 mounted for vertical movement as shown in FIGURE 1. At the appropriate time in the machine operating cycle, rod 90 is moved up by a conventional cam-operated mechanism or the like (not shown herein) so as to rotate link 88 counterclockwise (FIGURE 3) and thereby shift the member 86 down, against the tension of its return spring 92. Thus the heated sealing bar 82 is pressed against the upper sheet 32 and seals this sheet securely to the lower sheet 18 in the region shown in bold outline at 94 in FIGURE 8. This final seal region overlaps the preliminary seal, as shown in FIGURE 7, and is inboard of the opening 28 so that the communication channel previously established between this opening and the interior of the plastic sheet container is permanently closed. Thus, the container within the die is completely heat sealed around the entire periphery and is ready to emerge from the vacuum chamber 56.

Referring again to FIGURE 1, alongside the actuating rod 90 is a second actuating rod 96 the top of which is adapted to engage a pivoted link 98. This latter link operates a slidably mounted member 100 (FIGURE 3) carrying at its lower end a second sealing bar 102 with the usual electrical heater element 104. Rod 96 is shifted upwards simultaneously with rod 90 and thereby moves member 100 down against its return spring 106. This causes the heated sealing bar 102 to press the two plastic sheets together against the resilient beading 52 (FIGURE 11) on top of the partition 16. Accordingly, these two sheets are heat sealed together in the parallel regions shown in bold outline at 108 in FIGURE 10. Since these two sealed regions overlap the corresponding adjacent preliminary seals outlined in FIGURE 9, the final seal along the top of partition 16 creates two distinct and individually sealed packages which can be separated, without breaking the hermetic seal, by cutting the flange portion between the two regions 108.

If the products being packaged are relatively elongate, such as bacon, the partition 16 will be removed from all of the dies 10, and the control rod 96 similarly will be lifted out of its support 110. Thus, the main machine drive mechanism used to operate the final seal apparatus will operate only the control rod 90 and its associated linkages to seal the package at the side region 94, while the final seal bar 102 at the center of the package remains in its elevated position. In other words, the two final seal devices 82 and 102 are independently actuable, and provide a final seal only at the side marginal surface when the partitions 16 have been removed from the dies to develop a single container in each.

Referring now to FIGURES 6 and 11, the rubber covering forming the beading 52 on top of the partition 16 also extends part way down the narrow sides of this partition to form resilient tabs 112 serving as releasable engaging means to hold the partition in place. A portion of these tabs is recessed in vertical slots in the narrow sides of the partition, to assure that the tabs are locked firmly in place. The exposed portions of the tabs project out a sufficient distance to engage and be compressed against the transverse walls of the die (i.e. the walls extending transversely with respect to the die movement) so as to secure the partition in the die.

The transverse walls of the die 10 are relatively thin and somewhat springy and flexible, so that it is possible to insert the partition 16 into position by pressing it down into the die by hand. With some die constructions, superior results may be obtained by spreading the walls apart by a simple tool prior to insertion of the partition. In any event, after the partition is in place (and any tool removed, if used), the transverse die walls will be flexed out a small distance, and the resilient tabs 112 will be compressed a small amount. Due to the compressive reaction force, the frictional engagement between the tabs and the die walls is sufficient to hold the partitions in place, e.g. against the force of gravity so that the partitions cannot fall out when the dies are inverted during the return portion of their travel. When it is desired to remove the partitions, this can be done by pulling the partition out by exerting sufficient force to overcome the frictional restraint. If desired, a tool may be used to spring the die walls apart a small distance sufficient to release the frictional grip. In either event, the tabs 112 are disengaged to permit the partition to be withdrawn.

For additional stability, the partition 16 is formed with two legs 113 which seat in corresponding recesses 113a in the bottom of the die 10. The main body of the partition is held up above the bottom surface of the die, so as to provide an open communication passage around the partition. This assures that the forming vacuum applied through openings 71 (FIGURE 5) will reach all parts of the cavity 12.

At the remote ends of the partition beading 52, the rubber cover is formed into laterally extending flap portions 114 which are vertically tapered to provide narrow "feather" edges at the tips thereof. Each flap portion extends out over the top of the corresponding transverse wall of the die, and the die wall is provided at the point of joinder with a beading 50e (FIGURE 12) which is laterally enlarged inwardly in comparison with the beading on the remainder of the die wall (see FIGURE 13). This enlarged beading 50e presents a surface which slopes downwardly towards the die cavity and is shaped to mate with the overhanging flap portion 114. Thus, although the partition beading 52 and 114 is separate and distinct from the beading on the die, the partition beading is arranged with its ends abutting and resting against the die beading.

The remote end of each flap 114 extends above the die beading a small amount (shown exaggerated in the drawing). This is partly due to the compression of the tabs 112 which pushes a portion of the rubber up towards the top of the partition. Also, the angles of the mated sections of beading are purposely made slightly different to tend to produce this raised margin along the line of joinder when the partition is in place. The purpose is to insure that there is no depression along this line of joinder, particularly if there is any wearing of the rubber from extended use. This raised margin is sufficiently small that it does not interfere with the heat sealing operations, i.e. it is simply compressed down into the remainder of the beading to provide an essentially smooth and continuous exposed bead surface. Thus, the heated sealing bars will be presented with a uniform backing against which to press the plastic sheet material.

The entire beading on both the removable partition and the die walls is so positioned and dimensioned that all of the upper beading surfaces, i.e. those which serve as the resilient backing for the sealing operations, lie in a common plane. The arrangement of the tapered flap 114 particularly serves to prevent any significant irregularity or discontinuity in the planar surface presented to the sealing bars, and thereby helps assure that the seal which is formed over the region of joinder between the two beads will be complete and without leaks.

Accordingly, it will be evident that the apparatus and techniques disclosed herein are well suited to the achievement of the objects of this invention. Although a specific preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

We claim:

1. Apparatus for making and evacuating containers comprising a die defining a cavity with a marginal surface along at least a portion of its periphery, said die carrying a first sheet of flexible packaging material with a part thereof extending down into said cavity to conform thereto and a further part thereof forming a flange portion having an opening overlying said marginal surface; means for applying a second sheet of packaging material over said die to cover said cavity, said second sheet overlying said first sheet flange portion having said opening; sealing means movable against said die around the mouth of said cavity to cut off communication between outside atmosphere and the interior of the container formed by said two sheets of packaging material, said sealing means including means engaging said marginal surface outboard of the side edge of said second sheet next to said flange portion and maintaining the corresponding edge portion free for movement away from said opening; means extendable through said opening to engage said second sheet at said free edge portion to push said second sheet, including said free edge portion in its entirety, away from the first sheet to define an evacuation channel into the interior of said container; and means for evacuating said container through said channel.

2. Apparatus for making and evacuating packages comprising a die defining a cavity with marginal surfaces around the periphery, said die having a first sheet of flexible packaging material extending down into said cavity in the shape of a receptacle and forming flange portions adjacent said marginal surfaces on opposite sides of said die, the flange portion next to one of said side marginal surfaces having an opening therein; first and second clamp means carried by said die at said opposite sides thereof and operative to secure said flange portions against said side marginal surfaces; means for applying a second sheet of packaging material over said die to form a cover for the package receptacle in said die cavity; sealing means arranged to engage said marginal surfaces around the mouth of said die cavity to cut off communication between outside atmosphere and the interior of the package formed by said two sheets of packaging material, said sealing means engaging one of said side marginal surfaces inboard of the corresponding clamp means and engaging the opposite side marginal surface outboard of the other of said clamp means, thereby permitting the edge portion of said second sheet adjacent said other clamp means to be maintained free for movement away from the adjacent flange portion of said first sheet; a sheet separator movable through said flange portion opening to engage the second sheet in said edge portion thereof and to push said second sheet away from the first sheet, said two sheets thus defining an evacuation channel into the interior of said package; and means for evacuating said package through said channel.

3. Apparatus for making and evacuating packages comprising a plurality of dies arranged serially for movement around a closed path, each of said dies defining a cavity with marginal surfaces around the periphery, first and second clamp means on the respective sides of each die to receive and secure to the die corresponding side portions of a first continuous sheet of flexible packaging material, the central portion of said first sheet extending down into the die cavity to form a cup for receiving a product to be packaged, the part of said first sheet overlying one side marginal surface of each die forming a flange portion and being provided with an opening therein; means for applying a second continuous sheet of packaging material over said dies to form a cover for each die cavity, said second sheet being free of the clamp means adjacent said flange portion and overlying the region of said first sheet having said opening; sealing means movable against said dies in one position thereof and arranged to engage said marginal surfaces around the die cavity to cut off communication between outside atmosphere and the interior of the package formed by said two sheets of packaging material, said sealing means engaging said one side marginal surface outboard of the edge of said second clamp means and permitting the corresponding edge portion of said second sheet to be maintained free for movement away from the adjacent flange portion while said sealing means is engaged with the die; a sheet separator movable through said flange portion opening to engage the second sheet in said edge portion thereof and to push said second sheet away from the first sheet, said two sheets thus defining an evacuation channel into the interior of said package; and means for evacuating said package through said channel.

4. The method of making an evacuated package which comprises the steps of placing part of a first sheet of flexible packaging material in the cavity of a die having a marginal surface adjacent the periphery of the cavity on at least one side thereof, another part of said first sheet extending out over said marginal surface in the form of a flange with an opening therein; applying a second sheet of packaging material to said die to cover said cavity and to form a container with said first sheet therein, one side edge portion of said second sheet overlying said marginal surface of said die and covering said flange opening; sealing the interior of said container from outside atmosphere while maintaining said second sheet edge portion free for movement away from said first sheet flange; pushing said edge portion including the free edge thereof away from said flange to form an evacuation channel of substantial size into the interior of said container; and evacuating said container through said channel.

5. The method of making an evacuated package which comprises the steps of stretching a first sheet of flexible packaging material into the cavity of a die having a marginal surface adjacent the periphery of the cavity on at least one side thereof, one side portion of said first sheet extending out over said marginal surface in the form of a flange and being provided with an opening therein; applying a second sheet of packaging material to said die to cover said cavity and to form a container with said first sheet, one side edge of said second sheet overlying said marginal surface with the corresponding one side portion of said second sheet covering said flange opening; securing the opposite side portions of said two sheets to the corresponding side of said die adjacent thereto; sealing the interior of said container from outside atmosphere while maintaining said one side edge of said second sheet with its corresponding side portion free for movement away from said first sheet flange; inserting an element through said opening to push said one side portion, including the free edge thereof away from said flange to form an evacuation channel into the interior of said container; and evacuating said container through said channel.

6. The method of making an evacuated package which comprises the steps of forming a first sheet of stretchable and flexible packaging material into the cavity of a die having marginal surfaces around the entire periphery of the cavity, said first sheet extending out over said marginal surfaces to form corresponding flanges; providing an opening in one flange; applying a second sheet of packaging material to said die to cover said cavity with one marginal side portion of said second sheet being positioned over said flange opening, said two sheets forming a container therebetween; sealing said die cavity from outside atmosphere while maintaining said one marginal side portion including the side edge thereof free for movement perpendicularly away from said one flange; inserting an element through said opening to push said one marginal side portion away from said one flange to form an evacuation channel into the interior of said container; and evacuating said container through said channel.

7. The method of making an evacuated package which comprises the steps of applying a first continuous sheet of stretchable and flexible packaging material to a cavity in a product receiving tray mounted for movement past a series of operating stations, said tray having marginal surfaces around the entire periphery of the cavity, said first sheet being sufficiently wide to extend out over the side marginal surfaces to define corresponding flanges; providing an opening in the flange along one of said tray sides; applying a second continuous sheet of packaging material to said tray to cover said cavity and form a container therein, one marginal side portion of said second sheet being positioned over said flange opening; sealing said die cavity from outside atmosphere while maintaining said one marginal side portion including the adjacent sheet edge free for movement perpendicularly away from the corresponding flange along said one tray side; inserting an element through said opening to push said one marginal side portion including said adjacent sheet edge away from said corresponding flange to form an evacuation channel into the interior of said container; and evacuating said container through said channel.

8. Packaging apparatus comprising a die having a receptacle therein and mounted for movement past a series of operating stations, said die carrying a first sheet of packaging material formed down into said receptacle as a container for the products to be packaged, means supplying a second sheet of packaging material to said die, said second sheet overlying said first sheet to complete the package, sealing means at one of said operating stations to seal said second sheet to said first sheet around the front, rear and one side of said die, the edge portion of said second sheet at the other side of said die being maintained free for movement away from the corresponding portion of said first sheet; a sheet separator adjacent said other side of said die and mounted for movement through a slit in said first sheet to push against said edge portion of said second sheet, whereby said edge portion is shifted away from said corresponding portion of said first sheet to form an evacuation channel of substantial size between said sheets and into the interior of said receptacle; resilient means mounted immediately above said sheet separator and adapted to engage said second sheet when the latter is shifted by said separator; means including said resilient means defining a compartment at said other end of said die and communicating with said evacuation channel, said compartment extending laterally beyond the side edge portion of said second sheet and providing room for the shifting movement of said edge portion produced by said separator; and means for evacuating said package through the slit in said first sheet while said second sheet edge portion is being held pressed against said resilient means by said separator.

9. Apparatus for making and evacuating containers comprising a die defining a cavity with a marginal surface along at least a portion of its periphery, said die carrying a first sheet of flexible packaging material with a part thereof stretched down into said cavity and a further part thereof forming a flange portion having an opening overlying said marginal surface; means for applying a second sheet of packaging material over said die to cover said cavity, said second sheet overlying said first sheet flange portion having said opening; sealing means movable against said die to cut off communication between outside atmosphere and the interior of the container formed by said two sheets of packaging material, said sealing means including means engaging said marginal surface outboard of the edge of said second sheet next to said flange portion and maintaining the corresponding edge portion free for movement away from said opening; a sheet separator in said die and extendable through said opening to engage said second sheet at said free edge portion to push said second sheet away from the first sheet so as to define an evacuation channel into the interior of said container; said sheet separator being formed at its sheet engaging end with sharp means adapted to penetrate into said free edge portion and thereby to grip said sheet to prevent it from sliding off the end of said separator; and means for evacuating said container through said channel.

References Cited
UNITED STATES PATENTS 3,061,984 11/1962 Mahaffy _____ 53—112 X
3,196,590 7/1965 Ollier et al. _____ 53—112

TRAVIS S. McGEHEE, *Primary Examiner.*